April 23, 1935.  H. A. DREFFEIN  1,999,039
HEATING REGULATING METHOD AND APPARATUS
Filed Aug. 3, 1931
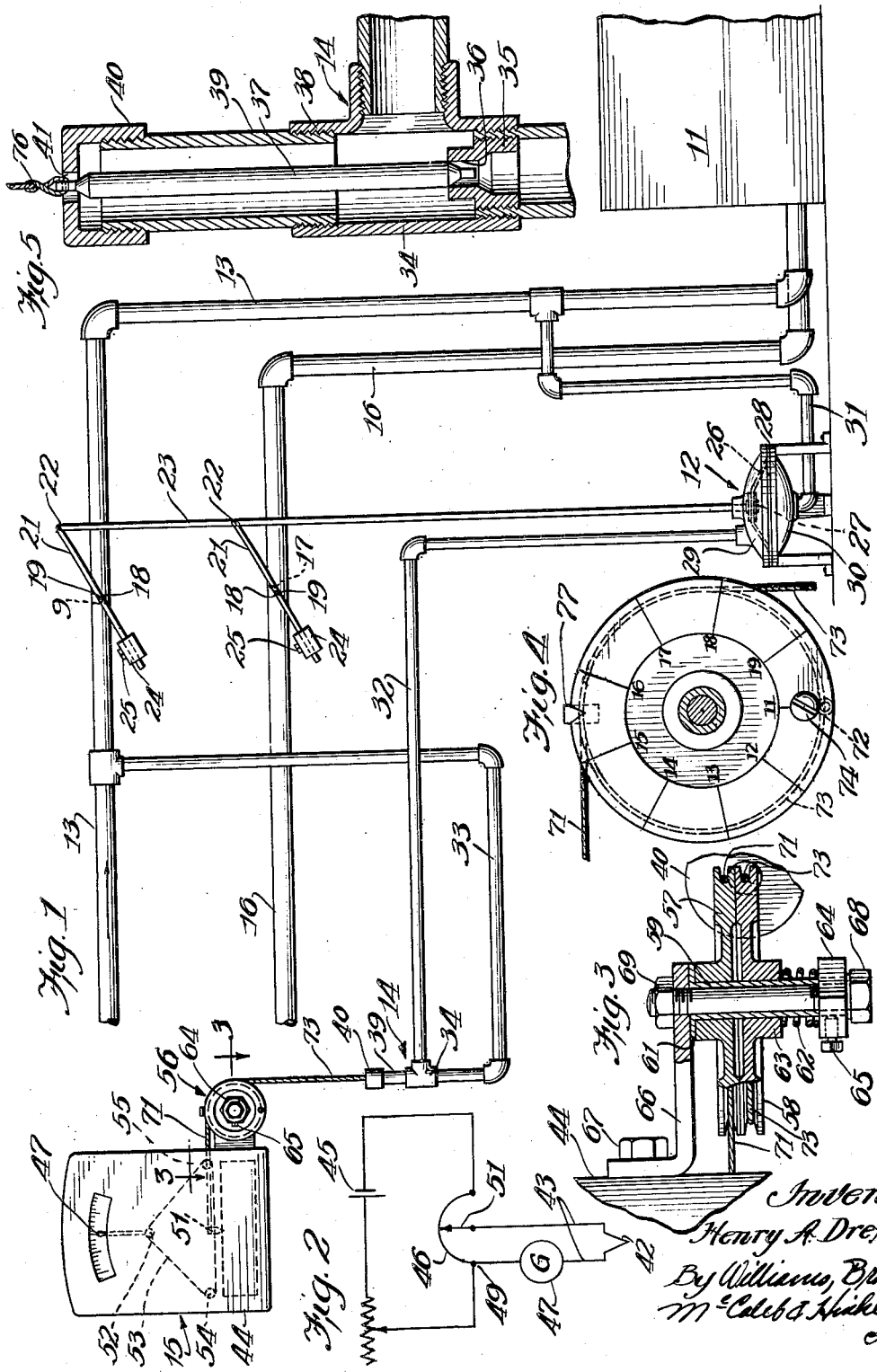
Inventor:
Henry A. Dreffein
By Williams, Bradbury,
McCaleb & Hinkle
Attys.

Patented Apr. 23, 1935

1,999,039

UNITED STATES PATENT OFFICE 1,999,039

HEAT REGULATING METHOD AND APPARATUS

Henry A. Dreffein, Chicago, Ill.

Application August 3, 1931, Serial No. 554,818

5 Claims. (Cl. 236—15)

My invention relates to heaters or furnaces. It has more particular reference to a method of and apparatus for controlling and regulating the temperature in a furnace.

Another object of the invention is the automatic variation of the rate at which combustion materials are supplied to a furnace consistent with desired temperature variations and in opposition to undesirable temperature fluctuations.

A further object of the present invention is the provision of automatic means in furnace control apparatus for controlling a variable difffer- ential of pressure, responsive to furnace temperatures, to regulate the rate of fuel and/or air supplied to the furnace.

The instant invention has for a further object the automatic operation of a fuel and/or air throttle or valve of a furnace by pressure responsive means automatically controlled by a temperature responsive means.

Numerous ether objects and advantages of the invention will be apparent as it is better understood from the following description, which, taken in connection with the accompanying drawing, discloses an embodiment thereof.

In the drawing:

Fig. 1 is a fragmentary diagrammatic view of a furnace control apparatus embodying the features of my invention;

Fig. 2 is a schematic wiring diagram of a temperature responsive device adapted to control the fuel control of my novel system;

Fig. 3 is a detailed cross section taken substantially on the line 3—3 of Fig. 1;

Fig. 4 is an elevation of the device shown in Fig. 3; and

Fig. 5 is an enlarged sectional detail of a portion of the system shown in Fig. 1.

My invention eliminates the difficulties and inconveniences of manually controlling and signally supervising the temperatures of furnaces or heaters and provides instead accurate control and close regulation of such temperatures which results in a more uniform product and output.

Briefly I accomplish the foregoing objects by automatically controlling a fuel and/or air supply valve or throttle 9 of a furnace or heater 11 by means of a pressure responsive device 12. This pressure responsive device is operable by a variable differential in pressure that is derived from a fuel and/or air supply line 13 and that is controlled or varied by a pressure control valve 14 at the supply side of the fuel and/or air valve or throttle 9. The pressure control valve 14 is operable by a temperature responsive means 15 connected to the furnace 11.

By so automatically controlling the pressure at one side of the pressure responsive device or supply valve controller 12, the rate of fuel and/or air supplied to the furnace may be so varied in response to the furnace temperature as to cause a greater supply rate when the furnace temperature is less than that desired and a lesser supply rate when the furnace temperature exceeds a desired value, whereby to increase or decrease the furnace temperature as desired. This automatic regulation and control of furnace temperatures tends to eliminate human errors, provides for the efficient utilization of the fuel and/or air and is, therefore, particularly suitable in the heat treatment of metals, alloys, ores and other products.

As already mentioned, the line or pipe 13 may be used to convey fuel and/or air to the furnace 11. If the line 13 be used as a fuel line, another line or pipe 16 may be connected to a suitable source of air supply, not shown, where desired, for supplying air to the furnace. Where desired this furnace air line 16 may be provided with a valve or throttle 17 for controlling the rate of air supply of the furnace.

The fuel and/or air valves may be independently operable or as shown, each of the valves or throttles 9 and 17 is provided with a valve stem 18 operably connected as at 19 with an arm 21. The arms 21 have pivotal connections 22 at one end thereof with a valve actuating lever or link 23 and are so counterbalanced by slidable weights 24 secured at the other end of the arms 21 by retaining screws 25 that the valves would tend to open if the lever 23 were free.

In order to control the rate at which the combustion materials are supplied to the furnace 11, I connect the valve actuating lever 23 to the pressure responsive device 12 which may be any suitable device which will rock or oscillate the fuel and/or air valve between a fully open position and a lesser open position and will not entirely close the valve. As illustrated, this pressure responsive device 12 includes a reciprocable member or diaphragm 26 connected to the lever 23 as at 27 and dividing a housing or casing 28 therefor into an upper pressure chamber 29 and a lower pressure chamber 30.

The lower chamber 30 communicates with the line 13 through pipe fittings or connections 31 at the furnace side of the valve 9 or between the furnace 11 and the valve. The upper chamber 29 is connected to the pipe line 13 at the opposite or supply side of the valve 9 by means of pipe fittings or connections 32 and 33 connected together by means of a T-fitting 34 providing a valve housing for a fitting 35 having a valve seat or port 36. The pressure in the chamber 30 is normally such as to cooperate with the counterbalancing weight or weights 25 in balancing the valve or valves in a slightly open position.

The T-fitting 34, fitting 35 suitably carried therein, and a valve stem or plunger 37 constitute the pressure control valve 14, as shown more particularly in Fig. 5, for controlling and varying the differential in pressure at opposite sides of the diaphragm 26 by controlling the flow of fuel and/or air to the upper pressure chamber 29 from the line 13. One arm 38 of the T-fitting 34 is extended by means of a nipple or connection 39 surrounding a portion of the stem or plunger 37 and having an end closure or cap 40 provided with a perforation or an aperture 41 forming a bleed or leak for slowly relieving the pressure in the upper pressure chamber 29.

The valve stem or plunger 37 is reciprocable between its closed position for the bleed or leak aperture 41 and its closed position for the valve port 36 to vary and control pressure in the upper chamber 29 by adjusting the relative effective openings of the aperture 41 and the port 36 and to provide for relieving the pressure at the upper side of the diaphragm 26 whereby to cause the fuel and/or air supply valve to be moved by the connecting links or levers 21 and 23 toward a lesser open or closed position.

By controlling the flow of fuel and/or air from the supply line 13 to the upper pressure chamber 29 to vary the pressure at the upper side of the diaphragm 26, I am enabled to vary the differential in pressure at opposite sides of the diaphragm derived from different locations in the supply line whereby to operate the fuel and/or air valve as the diaphragm 26 connected thereto by the linkages 21 and 23 responds to the variations in pressure.

An object of my invention is the automatic variation of the rate at which combustion materials, such, for example, as fuel and/or air are supplied to a furnace consistent with desired furnace temperature variations and in opposition to undesirable furnace temperature fluctuations. To this end the temperature responsive means 15 is provided to operate the valve plunger or stem 37 responsive to furnace temperatures.

The temperature responsive means 15 may be any suitable means which responsive to the furnace temperatures will so operate the valve 14 as the furnace temperature changes to cause the fuel and/or air supply valve to be simultaneously adjusted in accordance with the desired change in the rate of fuel and/or air supply of the furnace to produce either the desired change in furnace temperature or the desired furnace temperature.

While such a temperature responsive means per se forms no part of the present invention, it might be well by way of explanation, to point out that as illustrated schematically in Fig. 2, I employ a usual pyrometer which includes a thermocouple 42 mounted in the furnace 11 and having a potentiometer connection by means of wires or conductors 43 with a circuit in a control or indicating cabinet 44, having a suitable source of electrical energy 45 in series with a uniform resistor or slide wire 46.

The wires or conductors 43 connect the thermocouple 42 in series with a galvanometer 47 and a variable portion of the slide wire 46 in such manner as to oppose the potential derived from the circuit in the cabinet 44 by virtue of the connection of one of the wires 43 to the slide wire 46 as at 49 and the connection of the other wire 43 to a movable contact member 51 for varying the portion of the slide wire 46 in series with the thermocouple 42, whereby to vary the potential supplied to the thermocouple circuit from the source of electrical energy 45.

When the potential of the thermocouple 42 proportional to the temperature in the furnace 11 is equal to the potential supplied to the thermocouple in opposite direction from the slide wire 46, the galvanometer 47 is balanced, the galvanometer fluctuating to one side or the other of its balanced position as the temperature in the furnace changes and causes corresponding changes in the potential of the thermocouple. The movable contact 51 may be adjusted to restore the galvanometer to a balanced position.

The pyrometer may be of the type having an automatic self-balancer, not shown, to adjust the movable contact 51 in order to balance the potential of the thermo-couple by the potential of the slide wire. For example, as diagrammatically illustrated in Fig. 1, the self-balancer may drive a spindle or pulley 52 which may be connected by a cord or belt 53 passing about pulleys 54 and 55 with the movable contact 51, so that when the galvanometer 47 is deflected by an unbalancing temperature in the furnace the pulley 52 drives the cord or belt 53 and the movable contact 51 in respect of the slide wire 46 to restore the galvanometer to its balanced position.

For the purpose of reciprocating the valve plunger or stem 37 as the temperature in the furnace varies and for the purpose of manually adjusting the position of the valve stem or plunger 37 to cause a desired change in furnace temperature, I employ a connection between the movable contact 51 and the valve stem or plunger 37 which automatically operates the valve 14 as the movable contact is adjusted to compensate for the fluctuations of the galvanometer 47 in response to furnace temperature variations or optionally which may be manually adjusted to vary the relative effective openings of the port 36 and aperture 41 in controlling the variable differential in pressure at opposite sides of the diaphragm 26 to set the fuel and/or air valve or throttle at an open position providing a rate of flow of the fuel and/or air to the furnace consistent with a desired temperature or variation therein.

Such a device suitable for my purpose is illustrated more particularly in Figs. 3 and 4 and includes a rotatable or rockable unit generally designated by the reference character 56 which comprises frictionally engaging pulleys 57 and 58 carried on a sleeve or bushing 59 having a flange 61 at one end and a coil spring 62 at its other end. The flange 61 and the coil spring 62 hold the pulleys 57 and 58 in engagement on the sleeve 59, the spring 62 extending between a bearing boss or hub 63 of the pulley 58 and a nut 64 which may be adjustably locked on the end of the sleeve 59 opposite the shoulder 61 by means of a set screw 65.

This rockable or rotatable unit 56 is carried by the housing or casing 44 by means of a bracket 66 secured at one end to the housing 44 by bolts or other suitable securing means 67 and a bolt or shaft 68 passing through the spindle 59 and the other end of the bracket 66 and being secured in place by means of a nut 69.

The pulley 57 is connected to the movable contact 51 by means of a rope or cable 71 which passes over the pulley 57 and is suitably secured thereto in any suitable manner, such, for example, as by means of a screw 72. The pulley 58 is connected to the valve stem or plunger 37 by means of a rope or cable 73 secured at one end to the pulley as by a screw 74 and at the other end to the valve stem by any suitable means, such, for example, as that illustrated at 76 in Fig. 5. The pulley 58 may be calibrated in terms of degrees of temperature as illustrated in Fig. 4 and a suitable indicator or pointer 77 may be carried by the pulley 57.

In operation the pulley 57 may be held while the pulley 58 is manually or otherwise rotated until the desired temperature on the pulley 58 registers with the indicator 77 on the pulley 57. This rotation of the pulley 58 relative to the pulley 57 adjusts the position of the valve stem or plunger 37 in respect of the bleed or leak aperture 41 and the valve port 36 to permit fuel and/or air from the line 13 to flow through the connections 33 and 32 to the upper pressure chamber 29 in the pressure responsive device 12 or to relieve the pressure in the upper pressure chamber 29 through the pipe 32 and the leak aperture 41 for the purpose of causing the diaphragm 26 to adjust the fuel and/or air valve to a position permitting the flow of fuel and/or air to the furnace at a rate consistent with or corresponding to the indicated temperature. The pressure in the upper chamber 29 derived from the line 13 through the connections 32, 33, and 34, acts with the weight of the lever 23, and is opposed by the pressure in the chamber 30 acting with the weight 25 and tending to balance the valve in the slightly open position.

As the actual furnace temperature approaches this indicated or desired temperature the movable contact 51 is varying the potential obtained to oppose the potential of the thermocouple 42 whereby to balance the galvanometer 47 and thus moving the movable contact 51 is causing the pulley 57 to rotate which, in turn, is frictionally driving the pulley 58 and which is thereby readjusting the valve stem or plunger 37 in respect of the valve port 36 and the leak aperture 41. This gradual adjustment of the relative effective openings of the leak aperture 41 and the valve port 36 gradually changes the pressure in the upper pressure chamber 29 or at the upper side of the diaphragm 26, whereby to move the fuel and/or air supply valve gradually to the open position providing the rate of flow of fuel and/or air to the furnace 11 corresponding to the indicated or desired temperature.

When the temperature in the furnace reaches the desired or indicated value, the galvanometer 47 is balanced. If thereafter the furnace temperature varies from this desired or indicated temperature the galvanometer 47 is unbalanced and the movable contact 51 is moved by means of the belt or rope 53 along the slide wire 46 toward a position at which the galvanometer is restored to balance.

In so moving along the slide wire 46 the movable contact 51 is changing the position of the valve stem or plunger 37 to increase or decrease the pressure in the chamber 29 by increasing the effective opening of the valve port 36 with respect to the effective opening of the leak aperture 41, or by increasing the effective opening of the leak aperture 41 with respect to the effective opening of the valve port 36 respectively.

The pressures in the chamber 29 or at the upper side of the diaphragm 26 are inversely as the furnace temperatures. In other words, if the furnace temperature is greater than the indicated or desired temperature, the pressure in the chamber 29 is decreased so that the diaphragm under the influence of the pressure in the chamber 30 moves the valve actuating arm 23 in a valve closing direction to decrease the rate of fuel and/or air supply of the furnace whereby to restore the desired or indicated temperature.

By this novel and improved method and means of furnace control and regulation the temperature in the furnace may be quickly brought to a desired or indicated temperature by manually adjusting a remote fuel and/or air supply valve controller to cause the delivery of fuel and/or air to the furnace at a rate for producing the indicated or desired temperature. Thereafter this remote fuel and/or air valve controller automatically changes the rate at which fuel and/or air is supplied to the furnace inversely as the furnace temperature changes in order to provide close and constant regulation.

Such furnace control apparatus is not susceptible to the errors and inaccuracies encountered in manually operated or signally directed furnace control apparatus and substantially eliminates underheating and overheating, whereby uniformity in the product of the heat treating process is promoted.

The invention and many of its attendant advantages will be understood from the foregoing description and it will be apparent that various changes may be made in the form, construction and arrangement of the parts without departing from the spirit and scope of the invention or without sacrificing all or any of its material advantages, the form hereinbefore described being merely an embodiment of the invention.

Having thus described my invention, what I claim as new and desire to secure by United States Letters Patent is:

1. Actuating means for pressure operated control apparatus, comprising a temperature responsive device, a pressure conrolling valve having a pressure supply port and a pressure relieving aperture, and including a reciprocable valve stem movable by gravity toward the closing position of said port for varying the relative effective openings of said port and aperture, rotatable means connected to said valve stem and rotatable thereby during movement thereof by gravity, and means actuatable by said temperature responsive device and having frictional engagement with said rotatable means for limiting the port closing movement of said reciprocable valve stem in accordance with the actuating temperature of said temperature responsive device.

2. Actuating means for pressure operated control apparatus, comprising a temperature responsive device, a pressure control valve having a pressure supply port and a pressure relieving aperture, and including a reciprocable valve stem for varying the relative effective openings of said port and aperture, a pulley connected to said valve stem and rotatable thereby during movement thereof toward a closing position of said port, and another pulley rotatable by said temperature responsive device and drivingly engageable with the aforesaid pulley for moving said reciprocable valve stem in a port opening direction responsive to the actuating temperature of said temperature responsive device.

3. A control apparatus for the combustion materials supply line of a furnace, comprising a combustion materials control valve in said supply line, a pressure responsive valve controller for said control valve having an actuating pressure supply connection communicating with said supply line anteriorly of said control valve and having a pressure supply connection communicating with said supply line posteriorly of said control valve, a pressure control valve in said actuating pressure supply connection, a pulley operatively connected with said pressure control valve, and a pyrometrically driven pulley drivingly engaging the first said pulley for operating said pressure control valve responsive to furnace temperatures.

4. A control apparatus for the combustion materials supply line of a furnace, comprising a combustion materials control valve in said supply line, a pressure responsive valve controller for said control valve having an actuating pressure supply connection communicating with said supply line anteriorly of said control valve and having a pressure supply connection communicating with said supply line posteriorly of said control valve, a pressure control valve in said actuating pressure supply connection, a pyrometer responsive to furnace temperatures, and a pair of drivingly engageable pulleys, a said pulley being operatively connected to said pressure control valve and the other said pulley being driven from said pyrometer for operating said pressure control valve responsive to furnace temperatures.

5. A control apparatus for the combustion materials supply line of a furnace, comprising pressure responsive, combustion materials valve operating means having an actuating pressure supply connection with said supply line, a pressure control valve in said actuating pressure supply connection for regulating the actuating pressure of said pressure responsive, combustion materials valve operating means, manually operable rotatable control means for setting said pressure control valve whereby a desired actuating pressure will be supplied for operating said pressure responsive, combustion materials valve operating means to a predetermined operating position, said manually operable rotatable control means being rockable when so set, and temperature responsive means for rocking said manually operable rotatable control means to cause said pressure control valve to deliver an actuating pressure tending to maintain said pressure responsive, combustion materials valve operating means in said predetermined operating position.

HENRY A. DREFFEIN.